April 20, 1954 G. WALTERS ET AL 2,676,125
METHOD OF MAKING FRICTION-DISKS
Filed Dec. 23, 1950 3 Sheets-Sheet 1
Fig. 1
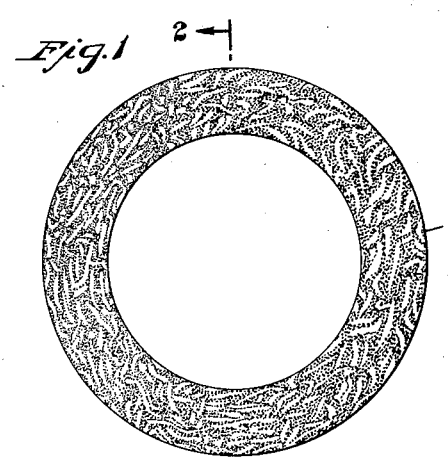
Fig. 2
Fig. 4
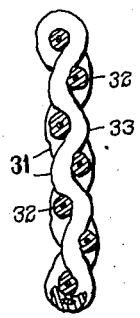
Fig. 3
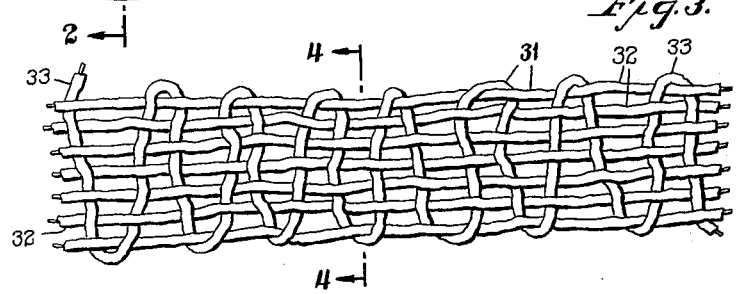
Fig. 5
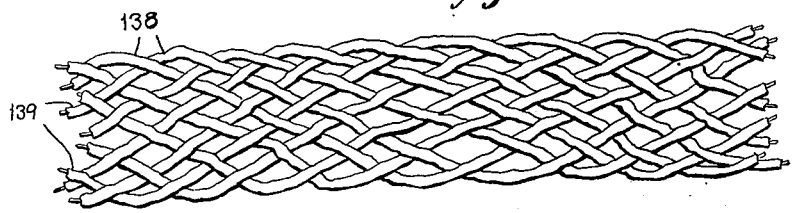
Fig. 6
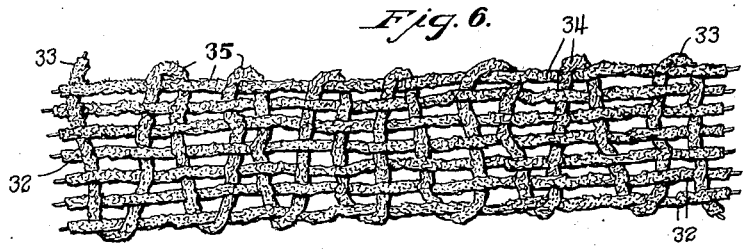
Fig. 7
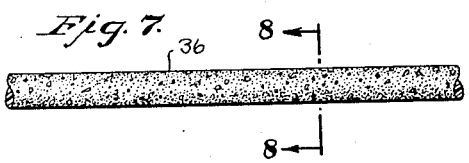
Fig. 8
Gustav Walters
Henry Clifford Morton
Inventors
By Seymour Earle Nichols
Attorneys April 20, 1954  G. WALTERS ET AL  2,676,125
METHOD OF MAKING FRICTION-DISKS
Filed Dec. 23, 1950  3 Sheets-Sheet 2
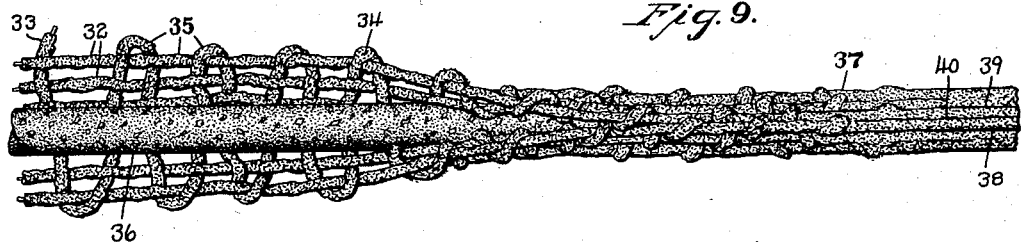
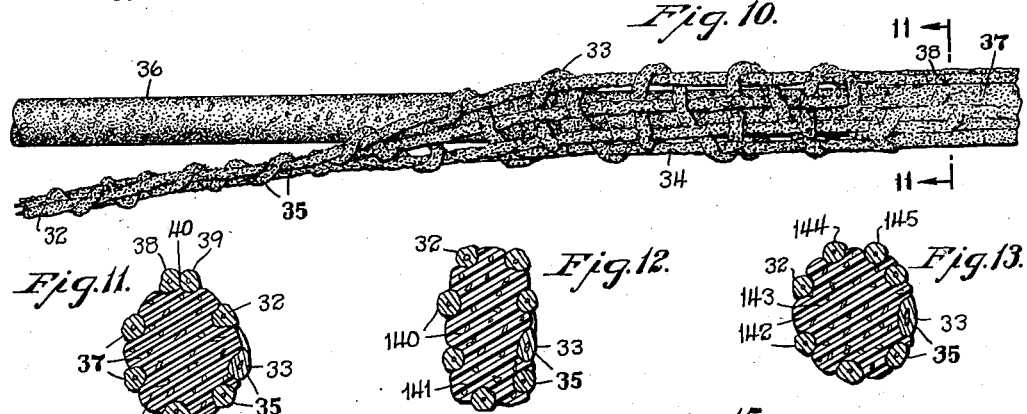
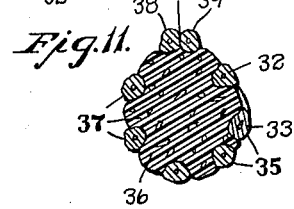 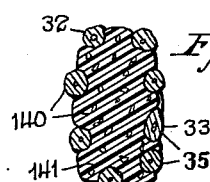 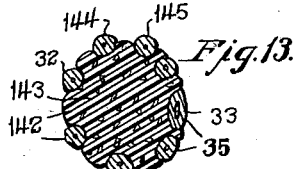
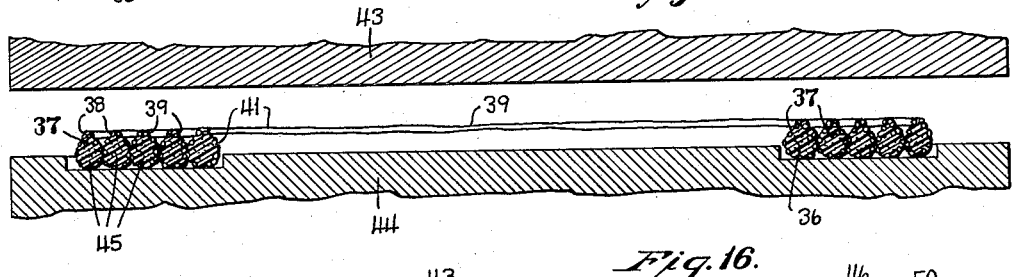
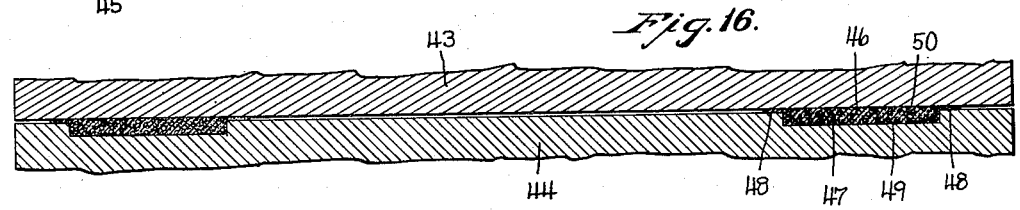
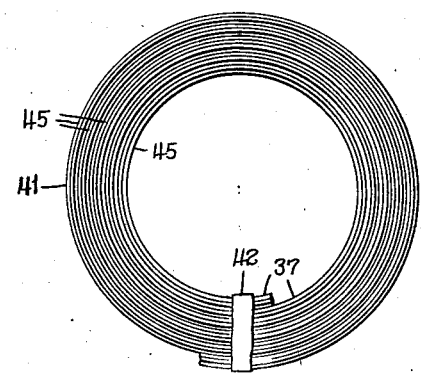
Gustav Walters
Henry Clifford Morton
Inventors
By
Attorneys April 20, 1954  G. WALTERS ET AL  2,676,125
METHOD OF MAKING FRICTION-DISKS
Filed Dec. 23, 1950  3 Sheets-Sheet 3
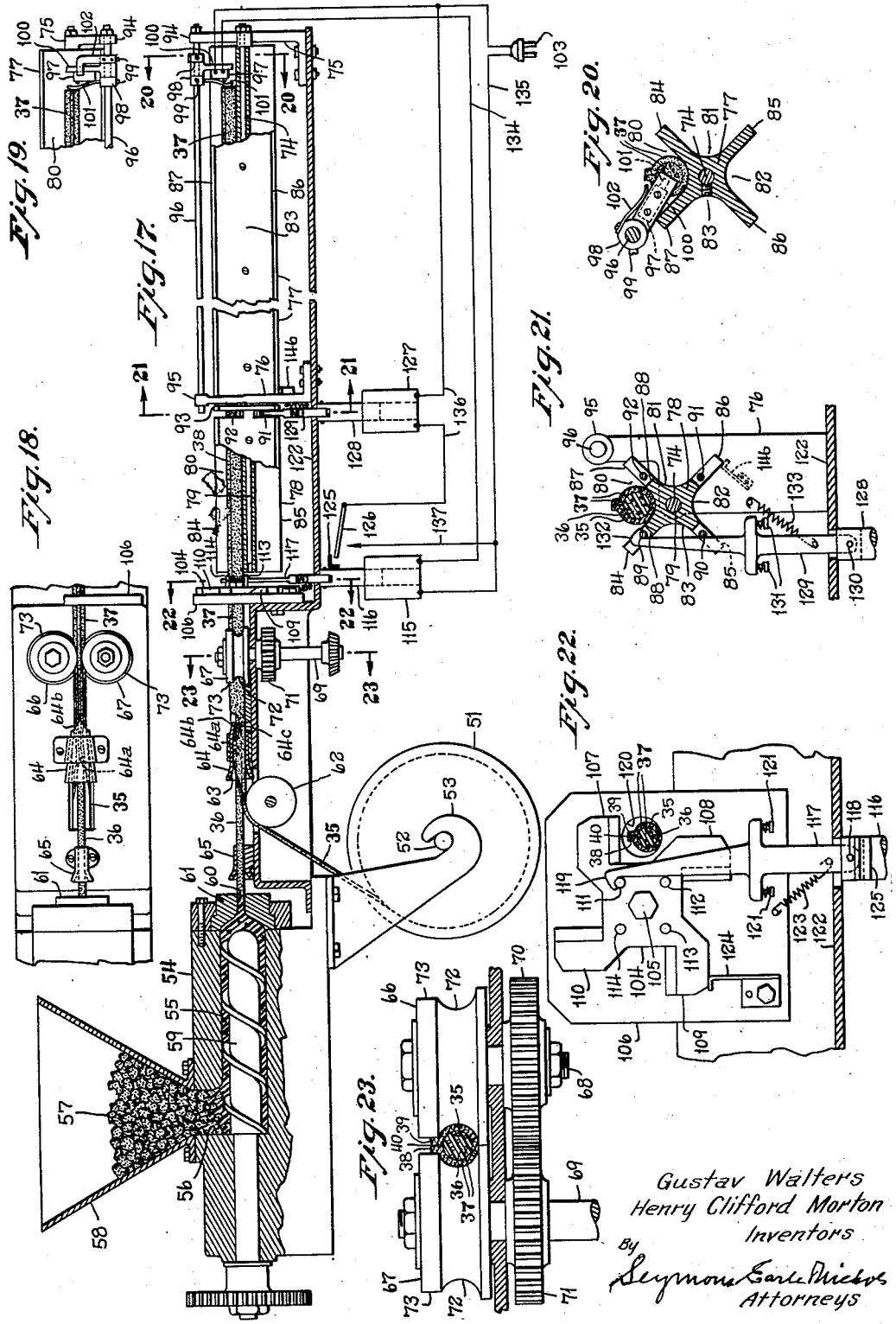
Gustav Walters
Henry Clifford Morton
Inventors
By
Seymour Earle Nichols
Attorneys Patented Apr. 20, 1954

2,676,125

UNITED STATES PATENT OFFICE 2,676,125

METHOD OF MAKING FRICTION-DISKS

Gustav Walters, Middletown, and Henry Clifford Morton, Branford, Conn., assignors to The Russell Manufacturing Company, Middletown, Conn., a corporation of Connecticut Application December 23, 1950, Serial No. 202,460

9 Claims. (Cl. 154—81)

This invention relates to improvements in methods of making friction-disks, and more particularly to making friction-disks for use in connection with clutches.

One object of this invention is to provide an improved method of more efficiently making the herein-described friction-disk.

Other objects and advantages will appear to those skilled in the art from the following, considered in conjunction with the accompanying drawings.

In the description and claims, the various parts and steps are identified by specific terms for convenience, but they are intended to be as generic in their application as the prior art will permit.

In the accompanying drawings forming part of the present disclosure, in which certain ways of carrying out the invention are shown for illustrative purposes:

Fig. 1 is a face view of a clutch friction-disk made in accordance with this invention;

Fig. 2 is a sectional view on line 2—2 of Fig. 1;

Fig. 3 is a face view of a portion of a woven web used in making a clutch friction-disk in accordance with this invention;

Fig. 4 is an enlarged transverse sectional view on line 4—4 of Fig. 3;

Fig. 5 is a face view of a modified form of web made by braiding instead of by weaving;

Fig. 6 is a view similar to Fig. 3 of the woven web of Fig. 3 after it has been impregnated with plastic friction material;

Fig. 7 is a face view of a plastic member of friction material which is to be combined with the impregnated web of Fig. 6 to produce a friction-disk in accordance with this invention;

Fig. 8 is a transverse sectional view on line 8—8 of Fig. 7;

Fig. 9 is a top plan view illustrating a mode of combining the impregnated web-member of Fig. 6 with the plastic member shown in Fig. 7 to form a composite member;

Fig. 10 is a front elevation of Fig. 9;

Fig. 11 is an enlarged sectional view on line 11—11 of Fig. 10;

Fig. 12 is a sectional view similar to Fig. 11 of a modified construction;

Fig. 13 is a sectional view similar to Fig. 11 of another modified construction;

Fig. 14 is a face view of a biscuit formed by winding a length of the composite member of Figs. 9, 10 and 11 into coiled or spiral form prior to subjecting the biscuit to heat and pressure;

Fig. 15 is a broken central vertical sectional view through a pair of heated dies and a biscuit, just prior to the dies being forced together;

Fig. 16 is a view similar to Fig. 15 after the dies have been forced together, the dies being heated to convert the biscuit into a compressed heat-hardened unitary friction-disk blank;

Fig. 17 is a schematic side elevation partly in section, illustrating a method of forming the composite member illustrated in Figs. 9, 10 and 11;

Fig. 18 is a top plan view of a portion of Fig. 17;

Fig. 19 is a top plan view of the right end-portion of the construction shown in Fig. 17;

Fig. 20 is a sectional view on line 20—20 of Fig. 17;

Fig. 21 is a sectional view on line 21—21 of Fig. 17;

Fig. 22 is a sectional view on line 22—22 of Fig. 17; and

Fig. 23 is a sectional view on line 23—23 of Fig. 17.

Referring to Figs. 1 to 4, 6 to 11 and 14 to 23, showing the particular form of the invention chosen for illustration therein, the friction-disk or -facing 30 is made by first weaving a loose, open, readily impregnated web or web-member 31 of warp strands 32 and a weft strand or weft picks 33, then passing the woven web 31 into a tank, not shown, containing heat-hardenable, plastic, bonding friction material 34 to form the impregnated or treated web 35 shown in Fig. 6. No particular bonding friction material is any part of the present invention, and any suitable bonding friction material may be used, such, for example, as bonding friction material containing a phenol-formaldehyde type of resin, as is well known to those skilled in the art. The bonding material initially is in the form of a heavy liquid solution which impregnates and clings to the web, which then is dried.

Also, a heat-hardenable bonding friction material plastic member 36 is molded in any suitable way, of the desired ingredients, as for example by extruding it through a die.

A suitable length of the plastic member 36 is then combined with a suitable corresponding length of the impregnated or treated web 35 in any desired way, as for example by successively folding portions of the web 35 about the plastic member 36 by hand or otherwise, to produce a composite member 37 which, throughout its length, is as illustrated at the right-hand end-portions of Figs. 9 and 10 and in the cross-sectional view of Fig. 11. Although the impregnated web-member 35 has been dried before it is combined with the plastic member 36 to form the composite member 37, nevertheless the dried impregnated web 35 is pressure-adhesive while cold, so that in addition to the strands of the web-member 35 being readily pressable into the surface of the plastic member 36, as will appear from Fig. 11, the two side edge-portions 38 and 39 are readily pressable by hand or otherwise into adhesive engagement with one another, as along the location 40, to thus aid in maintaining the members 35 and 36 in assembled relation during distortion of the same in performing the next step or operation, which consists in winding the composite member 37 to form what is known as a biscuit 41 illustrated in Fig. 14, which has the ends of the member 37 held by means of a piece of paper adhesive tape 42 or other suitable means.

The biscuit 41 is then placed between the complemental upper and lower die-members 43 and 44, preferably with the edge-portions 38 and 39 of the coiled portions 45 of the biscuit 41 all extending upwardly, as illustrated in Fig. 15, to be located in the rear face-portion 46 of the rough-pressed friction-disk or blank 47 shown in Fig. 16 after the heated die-members 43 and 44 have been forced together and held together sufficiently long to cause the plastic material of the web-member 35 and the plastic member 36 to become heated and flow between and through the strands of the web-member 35 and become substantially uniformly distributed through the rough-pressed friction-disk 47. After a suitable length of time, the die-members 43 and 44 are separated and the hardened rough-pressed disk 47 is removed and has its annular flash 48 sheared away, and the rough-pressed disk 47 ground on the front and rear surfaces 49 and 50, respectively, to produce the finished friction-disk 30 (Figs. 1 and 2).

Instead of forming the composite member 37 by hand, it can be formed by means of the mechanism illustrated in Figs. 17 to 23 inclusive. Referring to Fig. 17, a reel 51 containing a reeled-up length of impregnated web 35 has its trunnions 52 removably mounted for rotation in supporting-arms 53.

An extrusion mechanism 54 includes a cylindrical pressing-chamber 55 provided with a throat-entrance 56, through which chunks of plastic material 57 are received from a hopper 58. The pressing-chamber 55 has an extrusion-screw 59 fitting therein, which screw, by rotating, forces the plastic material out through the extrusion-hole 60 in the extrusion-die 61.

The impregnated web 35 is drawn up over the guide-pulley 62 and passes into the flared throat 63 merging into the generally cylindrical passage through a forming-guide 64, which curls the impregnated web up into a generally hollow form around the extruded cylindrical plastic member 36 which comes through the die-opening 60 and through the generally cylindrical guide-passage of a guide 65, and on into the hollow-shaped portion of the impregnated web 35 which is being folded around it and pressed into it, more or less, and then passes between a pair of feeding and pressing-rollers 66 and 67, respectively, mounted on shafts 68 and 69 which are driven at equal speeds by the shaft 69 and spur gears 70 and 71. The shaft 69 may be driven by adjustable mechanism in a way well understood by those skilled in the art, to permit of driving the feed-rolls 66 and 67 at any desired speed to feed the extruded plastic member 36 at the same speed that it is extruded through the die 61. As the plastic member 36 and web-member 35 pass through the forming-guide 64, a holding-finger 64a at the front portion of guide 64 extends down between the edge-portions 38 and 39 of the web-member, and holds the plastic member 36 down below the edges of the edge-portions 38 and 39. And as the plastic and web-members pass out of the rear end of guide 64, the smooth under face of a rear extension 64b thereof holds the top edges of the web 35 at equal heights, and the smooth blunt-pointed rear portion 64c of member 64b holds open, or spreads open if necessary, the edge-portions of the web-member 35, and holds the plastic member 36 down in proper position, so that the edge-portions 38 and 39 of the web-member 35 stand up and apart preparatory to their being engaged by the pressing-rollers 66 and 67. Each of the rollers 66 and 67 has a generally semicircular annular groove 72, which grooves, as shown in Fig. 23, give a generally cylindrical form to the composite member 37, while the cylindrical surfaces 73 on the rollers 66 and 67 press the two edge-portions 38 and 39 together to adhere them together along the location 40 (Figs. 23 and 11).

In order to cut the composite member off into suitable predetermined lengths while it continues to travel and be formed from the previously-formed and dried web 35, and the extruded plastic member 36 as the latter is being made by the extrusion-die, suitable mechanism is provided, as will now be described.

A horizontal shaft 74 is rotatably mounted in bearing-supports 75 and 76, and has firmly secured to it by set-screws or otherwise, two trough-sections 77 and 78. And in order to properly support the trough-section 78, the shaft 74 has a rearward shaft-extension portion 79 beyond the bearing-support 76. Both trough-sections are the same in cross section, and each trough-section 77, 78 has four troughs 80, 81, 82 and 83 with four corresponding separating-partitions 84, 85, 86 and 87. Each of the partitions of the trough-sections 78 has its end-portion adjacent the bearing-support 76 cut back from its outer edge to a location 88 sufficient to clear the four ratchet-pins 89, 90, 91 and 92 which extend through an end-plate 93 on the end of the trough-section 78 and into the partitions, for a purpose to be later described.

The bearing-supports 75 and 76 respectively have extensions 94 and 95 in which are rigidly secured a switch-support rod 96. A micro-switch 97 is slidable along the support-rod 96 and securable in any desired adjusted position by collars 98 and set-screws 99 or otherwise. A switch-support arm 100 is pivoted to swing on the switch-support rod 96 in a plane at right angles to the support-rod 96 and carries a switch-actuating arm 101 adapted to close the micro-switch 97 to close the electrical circuit leading from a power supply 103 when the end of the composite member 37 pushes the actuating-arm 101.

A cutter 104 is rotatably mounted at 105 on a support 106 and has four cutting-blades 107, 108, 109 and 110. The cutter 104 also has four ratchet-pins 111, 112, 113 and 114. A solenoid-coil 115, when electric current flows through it, draws the solenoid-armature 116 down into the coil 115 and pulls the pawl-arm 117, which is pivoted at 118 on the solenoid-armature, to thus cause the pawl-head 119 to pull down on the ratchet-pin 111, to thereby cause the cutter-blade 107 to sever the composite member 37 which is constantly traveling through the opening 120 in the support-plate 106. This downward swinging movement of the ratchet-pin 111 continues until it occupies the position shown by the ratchet-pin 112 in Fig. 22. Spring-pressed buffer-pins 121 engage the upper face of the frame 122 to minimize the shock at the end of the downward movement of the pawl-arm 117. The downward movement of the pawl-arm 117 takes place against the counter-action of the spring 123, which pulls the pawl-arm back up to its original position shown in Fig. 22 as soon as the electric current through the solenoid-coil 115 ceases. A leaf-spring lock 124 is secured to the support 106 so that it prevents reverse movement of the cutter 104 by engaging the rear of each cutter-blade after such cutter-blade has been forced past it by the pawl action previously described. The solenoid-armature 116 carries a switch-closing arm 125 which closes the switch 126 when the armature 116 is pulled to its lowered position by the solenoid-coil 115.

A second solenoid-coil 127 is adapted, when supplied with electric current, to pull its solenoid-armature 128 downward and carry along with it the pawl-arm 129 which is pivoted to the armature at 130. The pawl-arm 129 carries spring-pressed buffer-pins 131, which engage against the frame 122 to minimize the shock at the end of the down movement of the pawl-arm 129. When the pawl-arm 129 thus moves downward, its pawl-head 132 pulls the ratchet-pin 89 downwardly to the position occupied by pin 90 in Fig. 21. Upon the electric current being shut off from the solenoid-coil 127, the coil spring 133 returns the pawl-arm 129 upward to its original position shown in Fig. 21 ready for the next downward movement. A leaf-spring lock 146 secured to the support 76 prevents reverse movement of the trough-sections 77, 78 by engaging the rear of each trough-partition after such trough-partition has been forced past it by the pawl action previously described.

When the previously-referred-to engagement of the end of the composite member 37 against the switch-actuating arm 101 takes place, the latter will close the micro-switch 97 to thus close the electric circuit therethrough, whereupon electric current flows through the wires 134 and 135 to the first-described solenoid-coil 115, to cause it to actuate the cutter 104 to sever a length of composite member 37, which is of predetermined length by the particular setting of the microswitch 97 along the support-bar 96. When this cutting action takes place, the downward movement of the armature 116 causes the closing of the switch 126 as previously described, to thus close the electric circuit through the wires 136 and 137 to cause the second solenoid-coil 127 to pull its armature 128 down, to thus cause the pawl-head 132 to pull one of the four ratchet-pins 89, 90, 91 and 92 downwardly to cause the aligned trough-sections 77 and 78 to be rotated one-quarter of a turn, to thus dump the length of composite member 37 which has been cut, and bring the next-following trough into the position which was previously occupied by the trough which has been just described as having been dumped.

When the trough-sections are rotated one-quarter turn as just described, this causes the switch-support arm 100 to be swung about its pivot until the trough-partition which engages the switch-supporting arm 100 pushes past it, whereupon the weight of the switch-arm swings the latter down to its original position with the switch-actuating arm 101 in position to close the micro-switch when the constantly-traveling next section of the composite member 37 pushes against the switch-actuating arm 101, whereupon the cutting and dumping action previously described is again repeated, and so on as long as the composite member continues to be fed along a trough to the location of the micro-switch. To insure that the switch-supporting arm 100 returns to its operating position after a one-quarter rotation of the trough-sections, a leaf-spring 102 or other resilient means may be provided.

Instead of employing a web in which the strands are interlaced by weaving as heretofore described, a web having otherwise interlaced strands as, for example, the braided web 138 shown in Fig. 5, may be made by braiding the strands 139. Before use, the braided web 138 would be impregnated with plastic friction material, the same as in the case of the woven web 31 of Fig. 3. The strands employed preferably are the usual asbestos strands provided with a core strand or strands of brass, zinc or other suitable metal.

Instead of making the composite member 37 as illustrated in Figs. 9 to 11, a composite member 140 as illustrated in Fig. 12 could be employed, in which the plastic member 141 is originally of an approximate rectangular shape instead of the cylindrical shape of Fig. 11. Or, a composite member 142 as illustrated in Fig. 13 could be employed, in which the plastic member 143 could be cylindrical as in the case of the plastic member of Fig. 11, but having the impregnated web-member less wide as compared with the size of the plastic member, so as to avoid any abutting or cementing of the edges of the web-member. In other words, the size of the cylindrical plastic member 143 would be relatively larger than in the case of the cylindrical plastic member 36 of Fig. 11, so that the web-member 34 would not reach all the way around, but so the edges 144 and 145 would be spaced apart somewhat, as shown in Fig. 13.

While it is advantageous to manufacture the composite member by a continuous process as hereinbefore set forth, it will be appreciated that composite members for making friction-disks in accordance with this invention can be made by hand, and even without making the plastic core-member by extruding it. Thus, the core-member which does not have to be perfectly round or of any particular contour for use in this process, can be made by shaping a plastic mass up into shape by a person's hands. And then the previously-woven or braided web-member can be placed about the core-member and pressed there-into by hand, also. And the thus handmade composite member can be made in any predetermined length desired, or can be made in a long length and cut by hand-operated means or otherwise into the desired length, which can be coiled up into biscuits, in the manner hereinbefore described, and pressed to form friction-disks.

By forming a friction-disk or -facing of one or more composite members, each of which is formed from one or more plastic members and one or more impregnated web-members, the plastic members being formed separately or independently of the web-members, a number of important advantages are obtained. Thus, great economy of manufacture results. Also, a higher percentage of plastic material can be embodied in and substantially uniformly distributed through, a friction-disk, than where only one or more impregnated web-members are employed, since only a much smaller percentage of plastic material can be made to adhere to the web by the impregnating treatment. Also, coarse heavy particles such, for example, as brass chips, and also other desirable heavy friction-modifying agents such as particles of lead and other metals and barytes, and so forth, can be easily embodied in a plastic member, although they cannot be easily maintained uniformly mixed in a liquid, even in a thick liquid such as is employed for impregnating web-members. When heat and pressure is applied to the composite members forming the rough disk, the material of the plastic members is forced to flow between the strands and through the openings or interstices of the open web-members, so that the final result is a satisfactorily uniform friction-disk construction.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

We claim:

1. The method of making a friction-disk having a friction-face portion, comprising: providing a separately-made elongated heat and pressure moldable and hardenable bonding-friction-material plastic member; making separately, an elongated web member mainly formed of strands, and impregnating said separately-made web member with heat-hardenable bonding friction material; bringing said plastic member and said separately-made and impregnated web member into close relation with one another along their lengths to form an elongated composite member; coiling said composite member with its coil-portions in side-by-side relation; and subjecting said coiled composite member to heat and pressure to form a unitary disk.

2. The method of making a friction-disk having a friction-face portion, comprising: providing a separately-made elongated heat and pressure moldable and hardenable bonding-friction-material plastic member; making separately, an elongated web member mainly formed of interlaced strands, and impregnating said separately-made web member with heat-hardenable bonding friction material; bringing said plastic member and said separately-made and impregnated web member into close relation with one another along their lengths to form an elongated composite member; coiling said composite member with its coil-portions in side-by-side relation; and subjecting said coiled composite member to heat and pressure to form a unitary disk.

3. The method of making a friction-disk having a friction-face portion, comprising: providing a separately-made elongated heat and pressure moldable and hardenable bonding-friction-material plastic member; making separately, an elongated web member mainly formed of interlaced strands, and impregnating said separately-made web member with heat-hardenable bonding friction material; folding said impregnated web member about and into close relation with said plastic member along their lengths to form an elongated composite member; coiling said composite member with its coil-portions in side-by-side relation; and subjecting said coiled composite member to heat and pressure to form a unitary disk.

4. The method of making a friction-disk having a friction-face portion, comprising: providing a separately-made elongated heat and pressure moldable and hardenable bonding-friction-material plastic member; making separately, an elongated open web member mainly formed of interlaced strands, and impregnating said separately-made web member with heat-hardenable bonding friction material; folding said impregnated web member about and into close relation with said plastic member along their lengths to form an elongated composite member; coiling said composite member with its coil-portions in side-by-side relation; and subjecting said coiled composite member to heat and pressure to form a unitary disk.

5. The method of making a friction-disk having a friction-face portion, comprising: providing a separately-made elongated heat and pressure moldable and hardenable bonding-friction-material plastic member; making separately, an elongated web member mainly formed of interlaced strands and having side-edge portions, and impregnating said separately-made web member with heat-hardenable bonding friction material; folding said impregnated web member about and into close relation with said plastic member with said side-edge portions pressed together along their lengths to form an elongated composite member; coiling said composite member with its coil-portions in side-by-side relation; and subjecting said coiled composite member to heat and pressure to form a unitary disk.

6. The method of making friction-disks each having a friction-face portion, comprising: providing a separately-made elongated heat and pressure moldable and hardenable bonding-friction-material plastic member; making separately, an elongated web member mainly formed of strands, and impregnating said separately-made web member with heat-hardenable bonding friction material; causing said plastic member and said separately-made and impregnated web member to move longitudinally and into close relation with one another to form a traveling composite member; cutting off lengths of said composite member; coiling each cut-off length of composite member with its coil-portions in said side-by-side relation; and subjecting each coiled composite member to heat and pressure to form a unitary disk.

7. The method of making friction-disks each having a friction-face portion, comprising: providing a separately-made elongated heat and pressure moldable and hardenable bonding-friction-material plastic member; making separately, an elongated web member mainly formed of strands, and impregnating said separately-made web member with heat-hardenable bonding friction material; causing said plastic member and said separately-made and impregnated web member to move longitudinally and folding said impregnated web member about and into close relation with said plastic member to form a traveling composite member; cutting off lengths of said composite member; coiling each cut-off length of composite member with its coil-portions in side-by-side relation; and subjecting each coiled composite member to heat and pressure to form a unitary disk.

8. The method of making friction-disks each having a friction-face portion, comprising: extruding a separately-made elongated heat and pressure moldable and hardenable bonding-friction-material plastic member; making separately, an elongated web member mainly formed of strands, and impregnating said separately-made web member with heat-hardenable bonding friction material; causing said plastic member and said separately-made and impregnated web member to move longitudinally and into close relation with one another to form a traveling composite member; cutting off lengths of said composite member; coiling each cut-off length of composite member with its coil-portions in side-by-side relation; and subjecting each coiled composite member to heat and pressure to form a unitary disk.

9. The method of making friction-disks each having a friction-face portion, comprising: extruding a separately-made elongated heat and pressure moldable and hardenable bonding-friction-material plastic member; making separately, an elongated web member mainly formed of interlaced strands, and impregnating said separately-made web member with heat-hardenable bonding friction material; causing said plastic member and said separately-made and impregnated web member to move longitudinally and folding said impregnated web member about and into close relation with said plastic member to form a traveling composite member; cutting off lengths of said composite member; coiling each cut-off length of composite member with its coil-portions in side-by-side relation; and subjecting each coiled composite member to heat and pressure to form a unitary disk.

References Cited in the file of this patent

UNITED STATES PATENTS

| Number | Name | Date |
| --- | --- | --- |
| 1,844,461 | Chase | Feb. 9, 1932 |
| 1,875,645 | Norton | Sept. 6, 1932 |
| 2,025,039 | Cannon | Dec. 24, 1935 |
| 2,196,569 | Stroehla et al. | Apr. 9, 1940 |
| 2,264,901 | Gosling | Dec. 2, 1941 |
| 2,553,698 | Brahs | May 22, 1951 |
| 2,587,945 | Wirth | Mar. 4, 1952 |